UNITED STATES PATENT OFFICE.

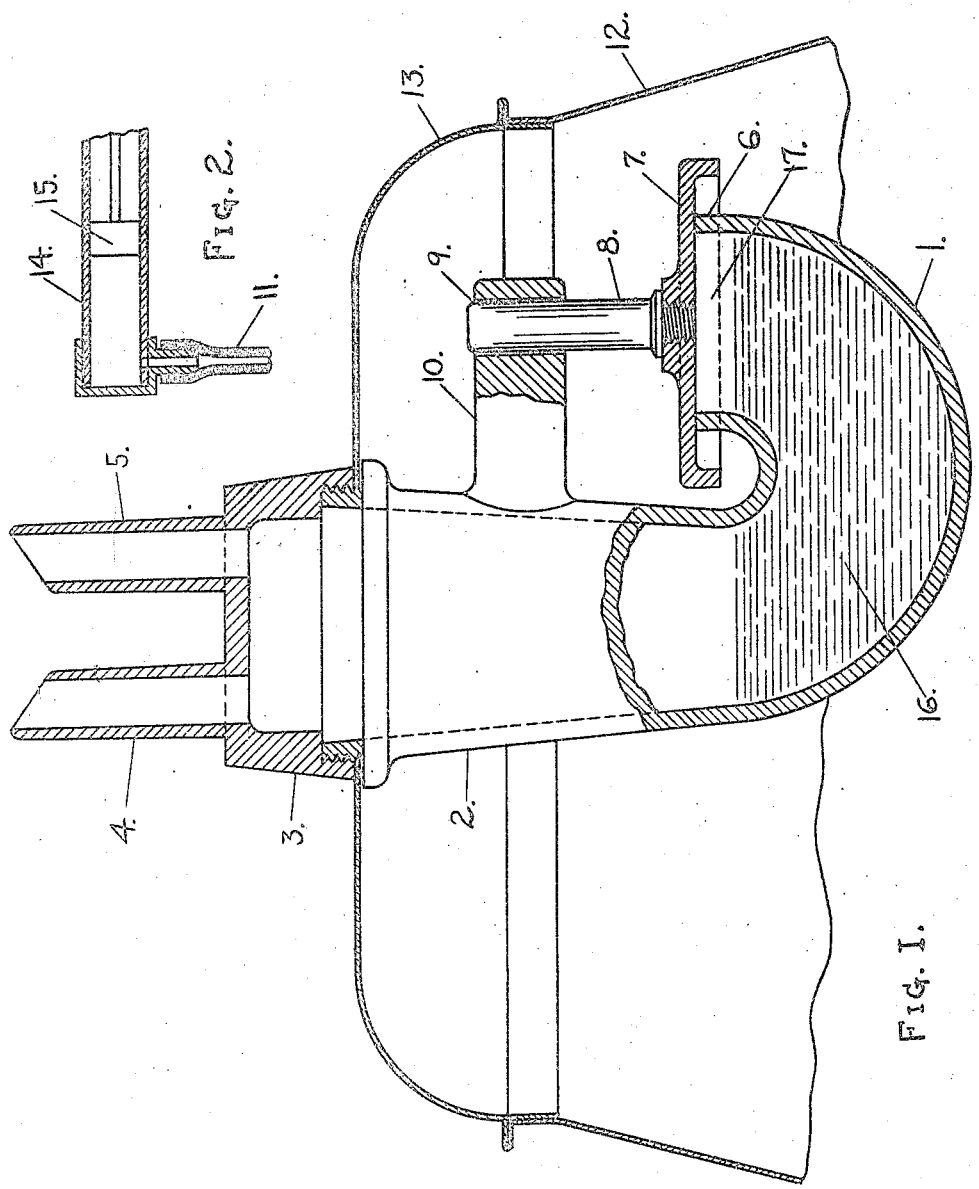

HECTOR STEWART, OF GALT, ONTARIO, CANADA.

MILKING MACHINERY.

1,209,902. Specification of Letters Patent. Patented Dec. 26, 1916.

Application filed March 24, 1916. Serial No. 86,530.

*To all whom it may concern:*

Be it known that I, HECTOR STEWART, of Galt, in the county of Waterloo, in the Province of Ontario, Dominion of Canada, have invented certain new and useful Improvements in Milking Machinery, of which the following is a specification.

My invention relates to improvements in milking machinery and more particularly to valves as used therein, and the object of the present invention is to devise a valve for this purpose which is strong, durable and cheap to manufacture.

A further object is to devise a valve which has a minimum number of simple parts and which is therefore not subject to get out of working order, and a still further object is to devise a valve in which a quantity of the milk becomes trapped therein; thereby helping to maintain the valve airtight.

My invention consists of a hollow valve of U-shaped formation, having one long chamber and one short chamber, a valveless top for the long chamber, air and milk passages extending outwardly from the valve top and a substantially air-tight valved outlet, closed by a gravity cap valve on the shorter chamber, all as hereinafter more particularly described and illustrated in the accompanying drawings in which:—

Figure 1 is a vertical elevation partly in section of my invention showing the milk trapped in the lower portion of the valve chamber. Fig. 2 is a vertical sectional elevation of a pump adapted to be employed with my valve.

1 indicates the lower trap portion of the valve chamber.

2 indicates the long chamber of the valve to the upper end of which is suitably attached the valveless top 3.

4 indicates a nipple to which is attached the tube leading to the teat-cups.

5 indicates a nipple to which is attached the tube 11 connecting the valve and pump.

6 indicates the short chamber which is open at its upper end.

7 indicates a gravity cap valve for the top of chamber 6.

8 indicates an upwardly extending guide arm carried by the cap 7 and which slides in a vertical bearing 9 formed in the arm 10 which is carried by the main portion of the valve chamber.

12 indicates the pail.

13 indicates the pail cover to which the valve is suitably attached.

14 indicates any suitable form of pump.

15 indicates the pump piston.

16 indicates the milk.

17 indicates the air cushion between cap 7 and milk.

The operation of my device is as follows: As the pump piston moves quickly outward air is drawn from the valve chamber through the passage 5 and tube 11. This causes the cap 7 to seat tightly on the top of the chamber 6 and prevents air from entering the valve chamber; on the return stroke of the pump there is a back pressure of air developed in the valve chamber and the gravity cap 7 is raised and air is blown out from the short chamber. Upon the next outward stroke of the pump piston the cap 7 is again hugged tightly closing the short chamber and a vacuum is developed in the valve chamber which draws milk from the cow through the teat-cups and passage 4. This milk accumulates in the lower portion of the milk chamber and as soon as end of the outward stroke of pump piston is reached the milk will begin to overflow from the short chamber into the pail. The return stroke again develops a back pressure in the milk chamber which forces more milk from the short chamber until the pressure is destroyed by the escape of air with the milk, leaving a quantity of milk trapped in the U-shaped chamber. As the pump piston again moves outward air is drawn from the long chamber, the cap 7 falling into contact with the open end of the short chamber leaving a quantity of air between the cap and the milk. The said cap being assisted by trapped milk makes the means by which the longer chamber is maintained air-tight.

From the foregoing it will be seen that I have devised a valve which is very simple and effective in its operation.

What I claim as my invention is:—

1. The combination in a milking machine of a valve chamber, having one vertically disposed chamber communicating with another vertically disposed chamber of less height, the upper end of the longer chamber being closed and provided with a perpendicular air exhaust and milk nipples with openings entering into the milk chamber and said longer chamber having a horizontal arm connected thereto and provided with a vertical bearing; the shorter chamber being open at the top, a cap engaging the open end of the shorter chamber and being provided with a perpendicular guide arm, the upper end of which being slidable in the said bearing, the rising and falling of said cap being controlled by gravity by the outflow of milk from the milk chamber, and the forces of air in the milk chamber.

2. A milking machine valve chamber, comprising a vertically disposed chamber extended at its lower extremity into an upward extending chamber of less height, a valveless air exhaust connection entering the milk chamber, the shorter chamber being open at its top, a self-closing valve for the said opening to prevent the entrance of air to the milk chamber, and means whereby milk may be admitted to the milk chamber from the cow, whereby a trapped quantity of milk and an air space between the said valve and milk is maintained in the milk chamber and the longer chamber is rendered air-tight.

3. In a milking machine, a U-shaped valve chamber having one long chamber and one short chamber, connected at their lower extremities by a U-shaped chamber, a removable top so adapted as to be put into air-tight connections with the long chamber, opposite perpendicular nipples, with open air and milk passages extending outward from the said top, said short chamber having a discharge opening, a gravity cap for said opening for rendering the valve chamber air-tight, a perpendicular guide arm for said cap, a horizontal arm extending from the long chamber through which the guide arm has vertical movements.

4. In a milking machine, a valve chamber comprising a long milk chamber of U-shaped formation so designed as to form a trap and closed at one end, and having an outlet at the other end, a gravity cap for the outlet of said chamber, whereby a trapped quantity of milk, and an air space between the cap and milk is maintained in the milk chamber, and the valve chamber is rendered air-tight.

HECTOR STEWART.

Witnesses:
  CHARLES H. CARLSON,
  ALEX. HARBOTTLE.